(12) United States Patent
Alfieri et al.

(10) Patent No.: US 7,496,788 B1
(45) Date of Patent: Feb. 24, 2009

(54) WATCHDOG MONITORING FOR UNIT STATUS REPORTING

(75) Inventors: Robert A. Alfieri, Chapel Hill, NC (US); Robert J. Hasslen, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 349 days.

(21) Appl. No.: 11/465,259

(22) Filed: Aug. 17, 2006

(51) Int. Cl.
*G06F 11/00* (2006.01)

(52) U.S. Cl. .............................. 714/21; 714/55; 714/10; 713/323

(58) Field of Classification Search ........................ None
See application file for complete search history.

(56) References Cited

U.S. PATENT DOCUMENTS

| | | | | |
|---|---|---|---|---|
| 5,544,082 A | * | 8/1996 | Garcia-Duarte et al. | 713/321 |
| 5,754,883 A | * | 5/1998 | Lim et al. | 710/18 |
| 5,887,178 A | * | 3/1999 | Tsujimoto et al. | 713/322 |
| 6,111,862 A | * | 8/2000 | Kaplan | 370/287 |
| 6,457,140 B1 | * | 9/2002 | Lindberg et al. | 714/6 |
| 6,711,700 B2 | * | 3/2004 | Armstrong et al. | 714/23 |
| 6,763,481 B2 | * | 7/2004 | Yamane | 714/11 |
| 2007/0288728 A1 | * | 12/2007 | Tene et al. | 712/227 |

\* cited by examiner

*Primary Examiner*—Christopher S McCarthy
(74) *Attorney, Agent, or Firm*—Patterson & Sheridan, LLP

(57) ABSTRACT

Systems and methods for monitoring the accuracy of unit status reporting within an application specific integrated circuit device may be used reduce power consumption. Accurate status reporting of an idle state is needed to safely disable a clock signal for a unit in order to reduce the power needed by that unit. A watchdog monitor may be used during functional simulation and synthesized for formal verification, emulation, and functional device testing and debugging. The watchdog monitor may also be configured based on specific characteristics of the unit that it is monitoring.

20 Claims, 6 Drawing Sheets

WATCHDOG MONITORING FOR UNIT STATUS REPORTING

BACKGROUND OF THE INVENTION

1. Field of the Invention

One or more aspects of the present invention relate generally to application specific integrated circuit devices, and more particularly to monitoring status reporting of processing units within a device.

2. Description of the Related Art

In conventional processing, clock gating is used to save power. Clocks are disabled using clock gating, for each unit according to status that the unit reports. In particular, when a unit reports an idle status, indicating that the unit is not processing data, then the clock signal input to that unit may be safely disabled. When a unit does not report status correctly, the clock signal will be disabled and data being processed by the unit may be corrupted. Therefore, the unit status reporting should be accurate to ensure proper processing of the data.

Accordingly, it is desirable to provide a mechanism to monitor each unit's status reporting and report any errors in order to enable safe clock gating and reduce power consumption for a device.

SUMMARY OF THE INVENTION

A behavioral watchdog monitor may be used during functional simulation to check for accurate status reporting for each processing unit within a device. The watchdog monitor may also be synthesized for use during formal verification, emulation, and during functional testing or debugging of the ASIC. The watchdog monitor reports any errors in each unit's status reporting in order determine if clock gating may be safely used to reduce power consumption for the device. The error reporting performed by the watchdog monitor may also be disabled.

Various embodiments of a method of the invention for monitoring status reporting within a computing device to identify error conditions include receiving a status reporting signal indicating whether a processing unit within the computing device is in an idle state or non-idle state, receiving an input valid signal or a valid output signal corresponding to an interface of the processing unit, determining whether an error condition occurs indicating that the processing unit incorrectly reported the idle or non-idle state based on the status reporting signal and the input valid signal or the valid output signal, and indicating the error condition occurred by setting an error flag corresponding to the error condition. The idle state indicates the processing unit is not processing data and the non-idle state indicates that the processing unit is processing data.

Various embodiments of the invention include a system for monitoring unit status reporting within a computing device to identify error conditions. The system includes an input valid combiner, an idle transition detector, and a watchdog monitor control unit. The input valid combiner is configured to receive input valid signals, each corresponding to an input interface of a processing unit within the computing device and produce a combined input valid signal. The idle transition detector is configured to receive a status reporting signal indicating whether the processing unit is in an idle state or non-idle state and produce an idle transition signal, wherein the idle state indicates the processing unit is not processing data and the non-idle state indicates that the processing unit is processing data. The watchdog monitor control unit is coupled to the input valid combiner and the idle transition detector and configured to produce an error flag based on the idle transition signal and the combined input valid signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Clock gating may be used to reduce power consumption within an ASIC device by disabling processing units within the device when those processing units are idle. Accurate status reporting of an idle state is needed to safely disable a clock signal for a unit. When the unit reports an idle state in error, any data being processed may be corrupted when the clock input to the unit is disabled. A watchdog monitor may be used during functional simulation to identify status reporting errors for each unit. In particular, the watchdog monitor may identify when a unit transitions from an idle state to non-idle state without receiving a valid input. The watchdog monitor may also identify when a valid output occurs when the unit is reporting an idle state. The watchdog monitor may be synthesized to produce circuitry for formal verification, emulation, and functional device testing and debugging. The watchdog monitor may also be configured based on specific characteristics of the unit that it is monitoring.

Figure 1:
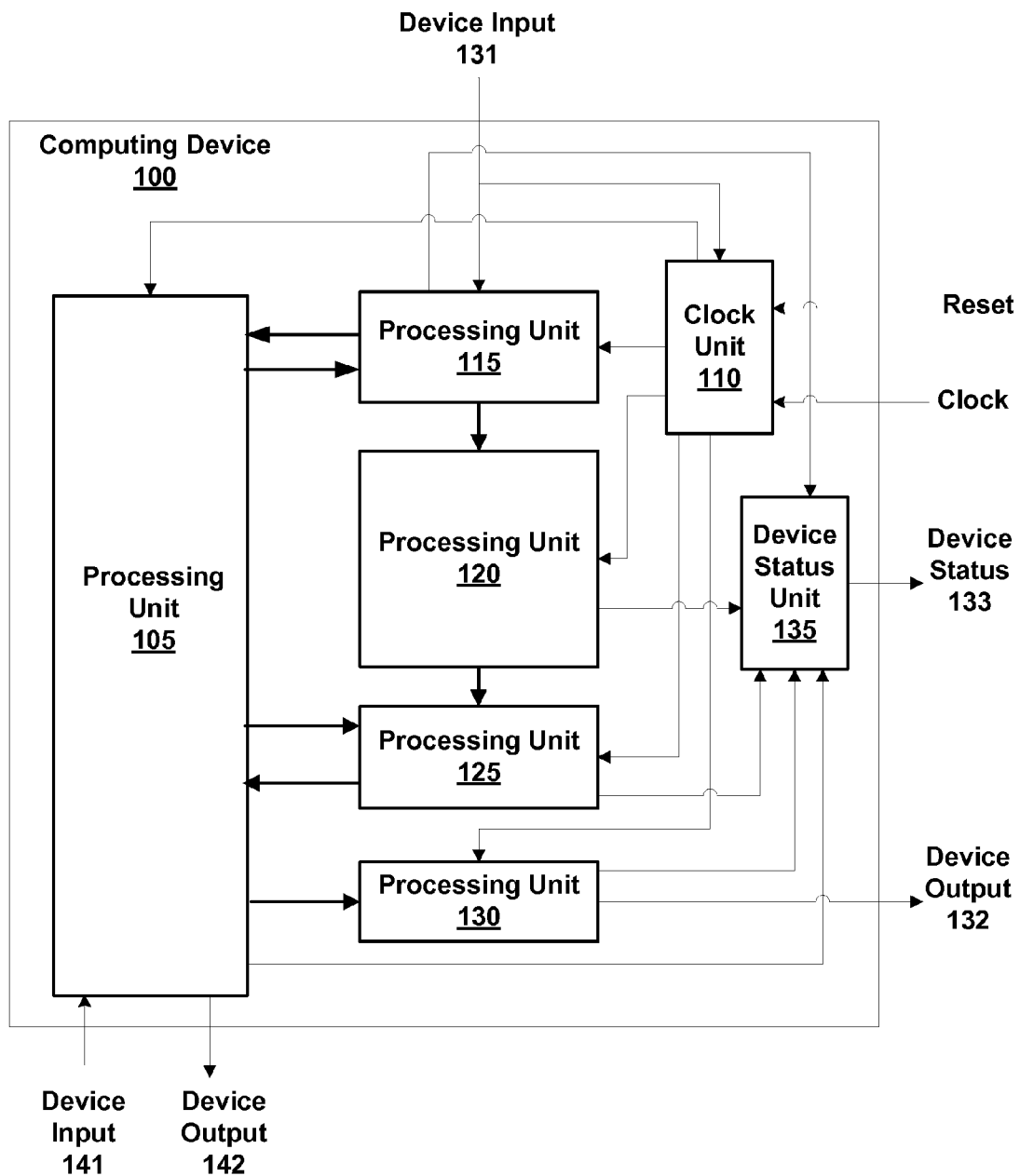
FIG. 1 illustrates one embodiment of an ASIC device in accordance with one or more aspects of the present invention.

FIG. 1 illustrates one embodiment of an ASIC, computing device 100, in accordance with one or more aspects of the present invention. Computing device 100 may be a networking processor, graphics processor, or the like. Computing device 100 includes one or more processing units 105, 115, 120, 125, and 130. Each processing unit may include one or more input interfaces that are each configured to receive input data and an input valid signal that indicates when the input data is valid and should be accepted for processing by the processing unit. Each processing unit may also include one or more output interfaces that are each configured to provide output data and an output valid signal that indicates when the output data is valid and should be accepted for processing by a receiving unit or receiving device.

Input interfaces of the processing units may be coupled to an output interface of another processing unit or another device, such as device input 131 and device input 141. Likewise, output interfaces of the processing units may be coupled to input interfaces of other processing units or another device, such as device output 132 or device output 142. In some embodiments of the present invention, each input interface may provide an output indicating that the input data cannot be accepted by the unit for processing. In those embodiments of the present invention, the input valid and input data is provided to the unit for multiple clock cycles, until the output indicates that the input data can be accepted by the unit for processing.

Computing device 100 also includes a clock unit 110 and a device status unit 135. Clock unit 110 provides a clock signal to each of the processing units. Clock unit 110 may also provide a reset signal to each of the processing units. The clock signals may be gated within clock unit 110 or gated locally, within each processing unit based on the status reporting provided by each of the processing units.

Device status unit 135 receives one or more error inputs from each of the processing units. The error inputs are provided by a watchdog monitoring unit within each of the processing units that indicate when a status reporting error has occurred. Device status unit 135 outputs a device status 133 that may be used to generate a system interrupt in a computing system. For example, each bit of device status 133 may correspond to a particular status reporting error that produces a system interrupt based on an interrupt mask that is stored in device status unit 135. Device status unit 135 may include system reporting error registers to store system reporting error flags for each error input received from a processing unit. These error flags are set when a corresponding error input is received and may by read by another device during interrupt processing and cleared as part of the interrupt processing. In this manner the watchdog monitors may provide useful status reporting error information during device testing and validation. Prior to device fabrication, the watchdog monitors may provide useful status reporting error information during functional simulation to confirm that clock gating may be used without corrupting the data being processed.

In some embodiments of the present invention, device status unit 135 is also configured to receive idle state signals from each of the processing units and output an idle status. The idle state signals from each processing unit may be combined to produce an idle status for computing device 100.

Figure 2:
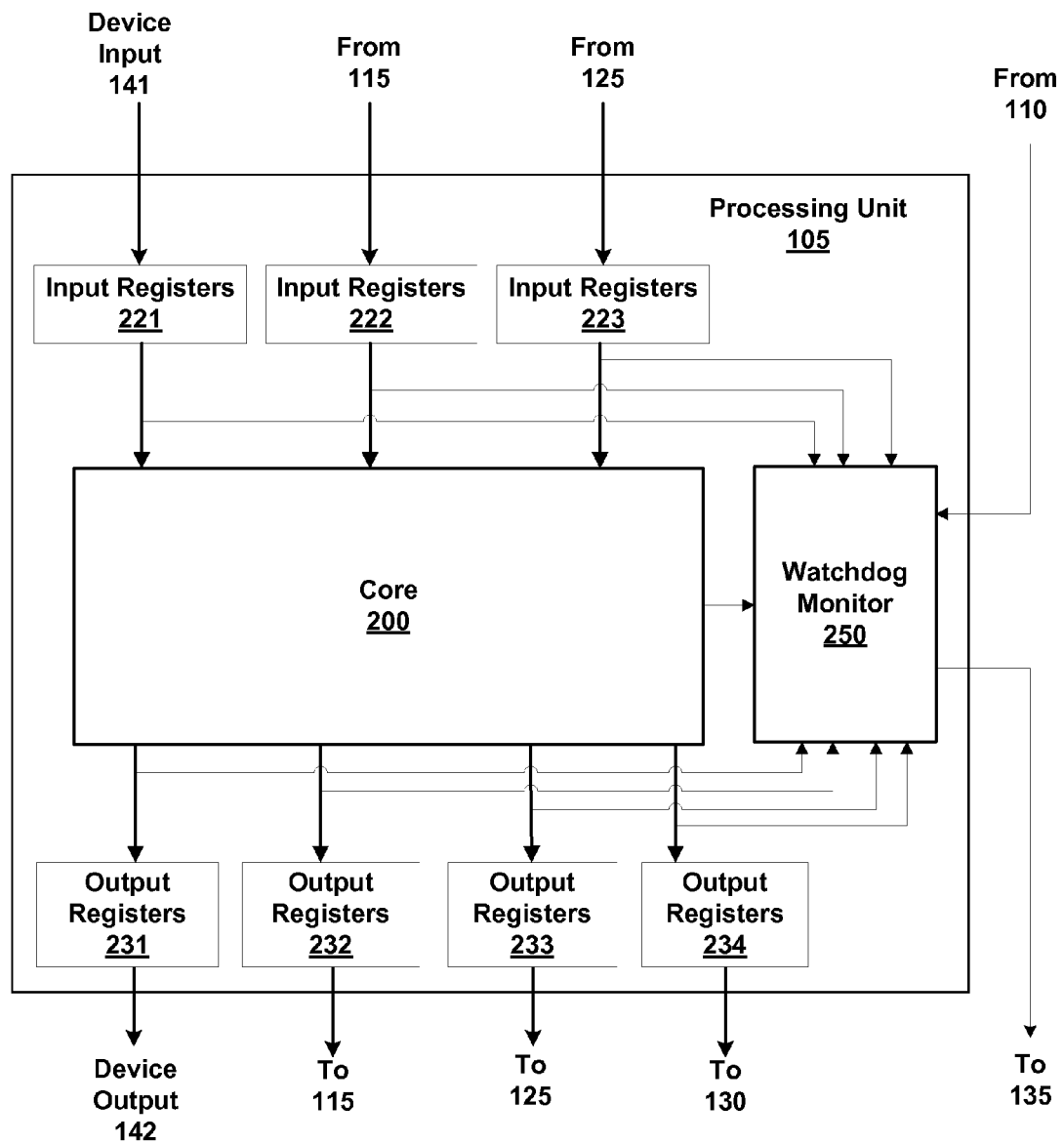
FIG. 2 is a block diagram of an embodiment of a processing unit of FIG. 1 in accordance with one or more aspects of the present invention.

FIG. 2 is a block diagram of an embodiment of processing unit 105 including a watchdog monitor 250 of FIG. 1, in accordance with one or more aspects of the present invention. Those skilled in the art will understand that each of processing units 115, 120, 125, and 130 also include watchdog monitor 250 and other sub-units as described in conjunction with processing unit 105. Watchdog monitor 250 within processing unit 105 receives a clock and reset signal from clock unit 110 and outputs one or more error inputs to device status unit 135. A core 200 includes one or more sub-units (not shown) that are configured to process input data and produce output data. Core 200 also provides one or more unit status reporting signals to watchdog monitor 250, such as an idle state signal that indicates when core 200 is idle or non-idle (active).

The clock signal provided to core 200 should not be disabled using clock gating when core 200 is not in an idle state. Although the clock signal may be disabled for core 200 to reduce power consumption, the clock signal should not be disabled for watchdog monitor unit 250. Therefore, the clock gating may be performed within processing unit 105 or clock unit 110 may provide gated and non-gated versions of the clock to processing unit 105.

Each input interface includes a set of registers to store the received input data and input valid signals. For example, input registers 221, 222, and 223 store device input 141, inputs from processing units 115 and 125, respectively. The input data valid signals for each of the input interfaces output by input registers 221, 222, and 223 are provided to both watchdog monitor 250 and core 200. Although the input valid signals can be provided to watchdog monitor 250 directly from device input 141 and processing units 115 and 125, it is preferable to present a single load (corresponding to one register) at the input interfaces since the connections providing the inputs to processing unit 105 may introduce timing delays due to routing across the device.

Each output interface includes a set of registers to store the output data and output valid signals. For example, output registers 231, 232, 233, and 234 store device output 142, outputs for processing units 115, 125, and 130, respectively. The output data valid signals for each of the output interfaces are provided to watchdog monitor 250 directly from core 200 to limit the number of loads presented to the outputs of output registers 231, 232, 233, and 234. Limiting the number of loads for the outputs may reduce timing delays incurred due to routing.

Figure 3:
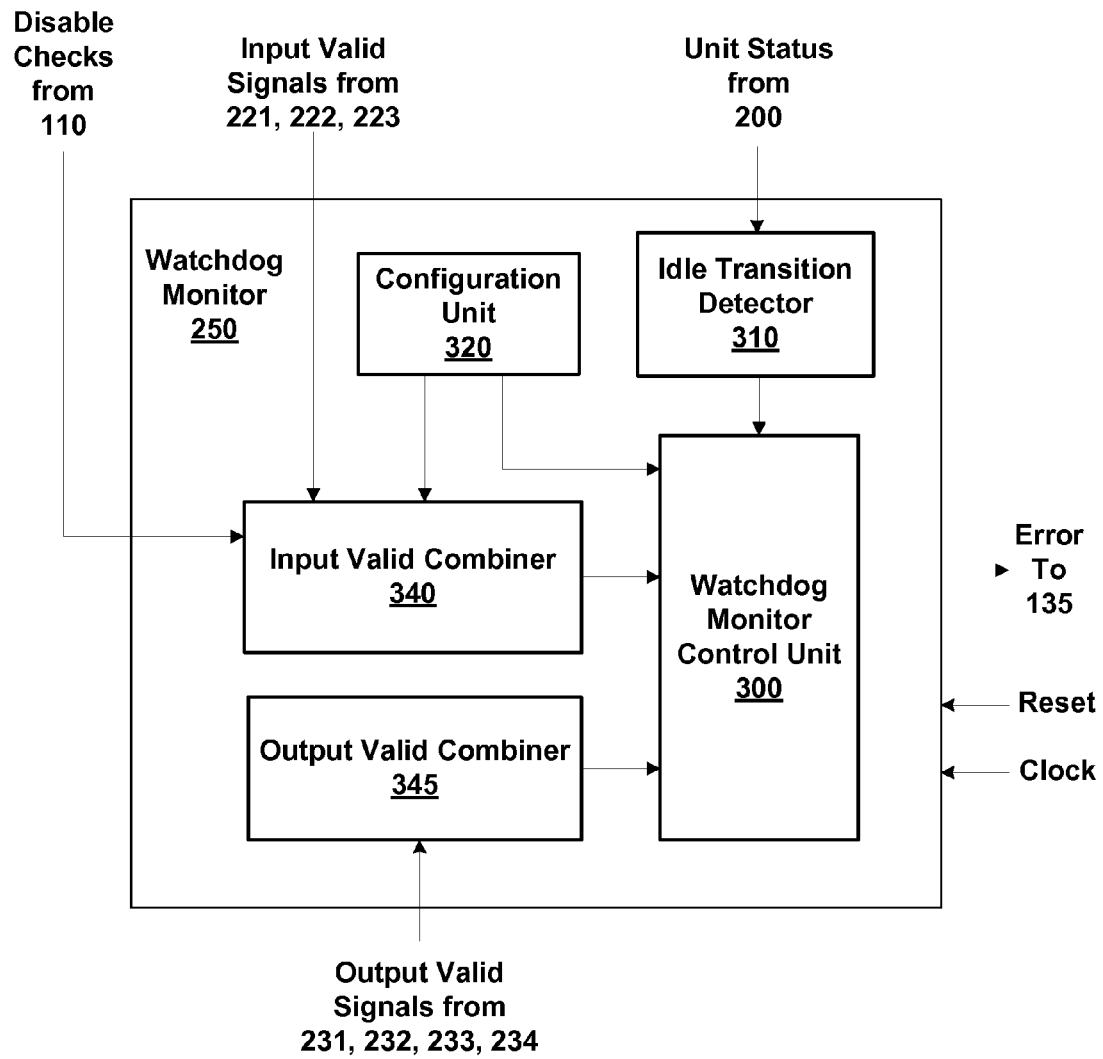
FIG. 3 is a block diagram of an embodiment of the watchdog monitor of FIG. 2 in accordance with one or more aspects of the present invention.

FIG. 3 is a block diagram of an embodiment of watchdog monitor 250 of FIG. 2, in accordance with one or more aspects of the present invention. Watchdog monitor 250 includes a configuration unit 320, an idle transition detector 310, an input valid combiner 340, an output valid combiner, and a watchdog monitor control unit 300. Idle transition detector 310 determines when an idle state of core 200 has changed from idle to non-idle, i.e., when core 200 is active and processing data, and outputs an idle transition signal to watchdog monitor control unit 300. Idle transition detector 310 also passes the idle status reporting signal received from core 200 through to watchdog monitor control unit 300 in order for watchdog monitor control unit 300 to determine whether or not an "output valid while idle" error has occurred.

Input valid combiner 340 receives a disable checks signal from clock unit 110 and the input valid signals from each input register and produces a combined input valid signal that is output to watchdog monitor control unit 300. The disable checks signal is asserted when clock gating is enabled to disable error checking. When disable checks is asserted and an input valid is received a saved_valid_input signal is produced, as described in conjunction with FIG. 6. Saved_valid_input is used to prevent an error from being indicated when the disable check signal is negated and the idle transitions to indicate that the processing unit is active (as a result of the earlier input valid signal). The disable check signal may also be used to disable error checking when a context switch operation is being performed to reconfigure one or more processing units 105, 115, 120, 125, and 130, or computing device 100.

Input valid combiner 340 also receives configuration information from configuration unit 320. Specifically, a relax_input setting may be used to configure input valid combiner to modify saved_valid_input so that a "non-idle transition" error is indicated by watchdog monitor control unit 300 when the idle state transitions from idle to non-idle when core 200 hasn't received a input valid signal, ignoring the input valid to non-idle delay. The configuration information may also include an input valid to non-idle delay value that is specified for each processing unit. The input valid to non-idle delay value and relax_input setting may be fixed or programmable. The input valid to non-idle delay value specifies the number of clock cycles for the idle state to indicate that the processing unit is non-idle after an input valid signal is received.

Input valid combiner 340 includes a delay line with multiple taps to provide delayed idle state signals that correspond to each clock cycle specified by the input valid to non-idle delay value. The combined input valid signal is the logical OR of the saved_valid_input, input valid, delayed input valid signals.

Output valid combiner 340 receives output valid signals input to each output register and produces a combined output valid signal that is output to watchdog monitor control unit 300. The combined output valid signal is the logical OR of the output valid signals. Watchdog monitor control unit 300 is a finite state machine that receives the idle transition signal, combined input valid, and combined output valid and produces a "non-idle transition" error signal and an "output valid while idle" error signal, as described in conjunction with FIGS. 4A, 4B, 5A, and 5B. Watchdog monitor control unit 300 may also receive configuration information from configuration unit 320. In particular, enable signals may be specified for each error signal to prevent each of the errors from being indicated. Watchdog monitor 250 receives a reset signal that is used to initialize the registers and watchdog monitor control unit 300.

Figure 4A:
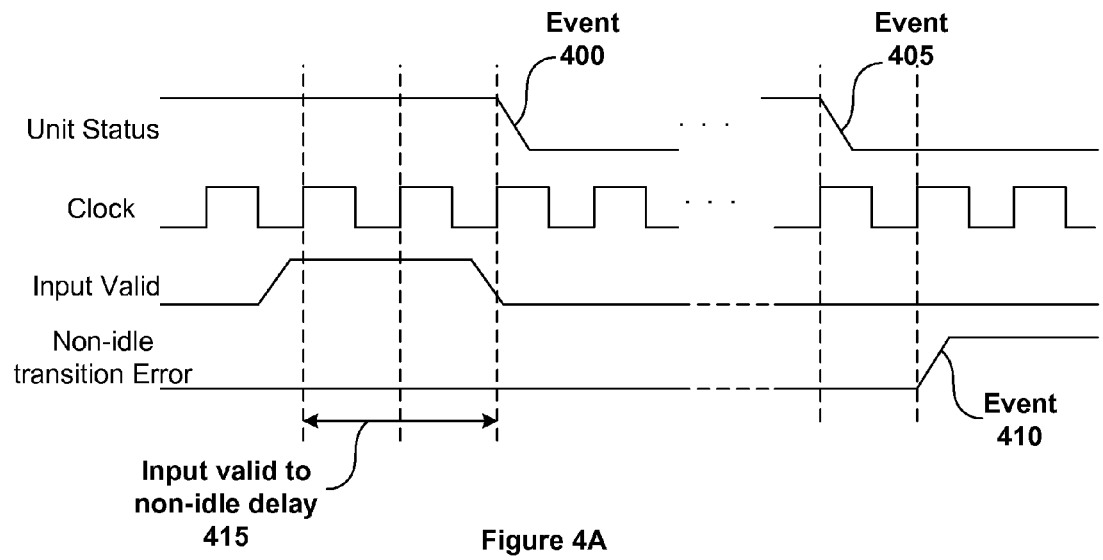
FIG. 4A is a timing diagram of the "non-idle transition" error generation in accordance with one or more aspects of the present invention.

FIG. 4A is a timing diagram of the "non-idle transition" error generation performed by watchdog monitor 250, in accordance with one or more aspects of the present invention. Idle is a unit status signal that is asserted when the processing unit is not active. An input valid signal is asserted for two clock cycles. The input valid to non-idle delay 415 is the value specifying the number of clock cycles for the idle signal to indicate that the processing unit is non-idle after the input valid signal is received. As shown, the input valid to non-idle delay 415 is two clock cycles. An event 400 occurs when the idle signal changes, indicating that the processing unit has transitioned from an idle to a non-idle state. The "non-idle transition" error signal is not asserted in response to event 400 since an input valid signal was asserted.

At a later point in time, an event 405 occurs, indicating that the processing unit has transitioned from an idle to a non-idle state. An input valid was not received since event 400, therefore event 410 occurs in response to event 405. The "non-idle transition" error signal is asserted for event 410, indicating that a transition from an idle to non-idle state has occurred when a valid input was not received.

Figure 4B:
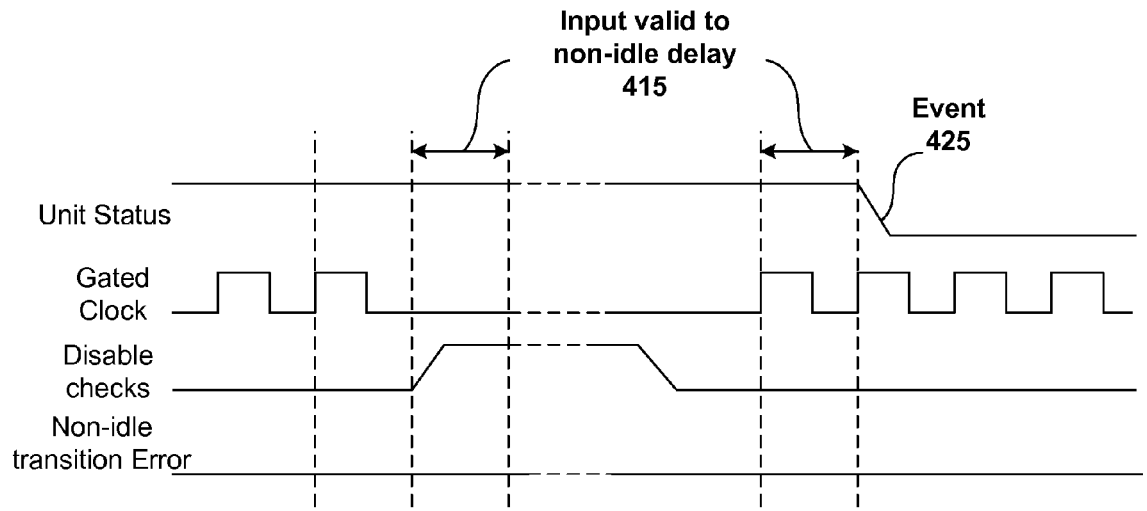
FIG. 4B is a timing diagram of the "non-idle transition" error generation with clock gating in accordance with one or more aspects of the present invention.

FIG. 4B is a timing diagram of the "non-idle transition" error generation with clock gating performed by watchdog monitor 250, in accordance with one or more aspects of the present invention. Input valid is asserted for a single clock cycle before gated clock is disabled and disable checks is asserted. The input valid signal is saved by input valid combiner 340 while disable checks is asserted. A first clock cycle of the two clocks specified by input valid to non-idle delay 415 occurs before the clock is disabled. The second clock of the two clocks occurs after the clock is enabled and disable checks is negated. Therefore, "non-idle transition" error is not asserted in response to event 425. Event 425 occurs when the idle signal changes, indicating that the processing unit has transitioned from an idle to a non-idle state due to the earlier asserted input valid signal. If the disable checks signal is not used to save the input valid when gated clock is disabled, a "non-idle transition" error signal may be incorrectly asserted in response to event 425.

Figure 5A:
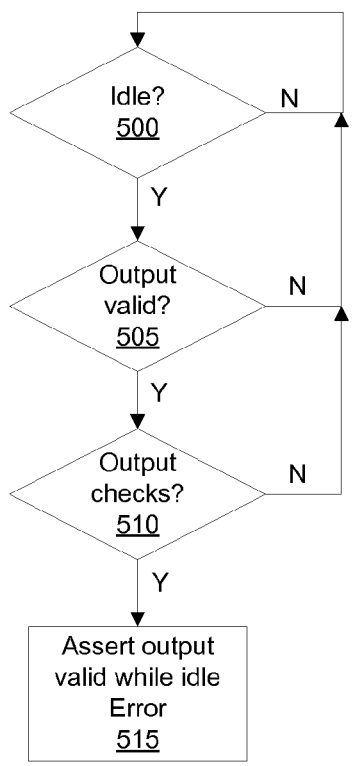
FIG. 5A is a flow diagram of an exemplary embodiment of determining an "output valid while idle" error condition in accordance with one or more aspects of the present invention.

FIG. 5A is a flow diagram of an exemplary embodiment of determining an "output valid while idle" error, in accordance with one or more aspects of the present invention. In step 500 watchdog monitor control unit 300 determines if the idle status reporting signal from core 200 is asserted, indicating that core 300 is in an idle state. If, in step 500 watchdog monitor control unit 300 determines that the idle status reporting signal is not asserted, then watchdog monitor control unit 300 repeats step 500. Otherwise, in step 505 watchdog monitor control unit 300 determines if the combined output valid signal from output valid combiner 345 is asserted, indicating that at least one of the output valid signals is asserted and data processed by core 200 is ready for output.

If, in step 505 watchdog monitor control unit 300 determines that the combined output valid signal is not asserted, then watchdog monitor control unit 300 returns to step 500. Otherwise, in step 510 watchdog monitor control unit 300 determines if output checking is enabled, i.e., if the "output valid while idle" error is enabled. If, in step 510 watchdog monitor control unit 300 determines that output checking is enabled, then watchdog monitor control unit 300 returns to step 500. Otherwise, in step 515 watchdog monitor control unit 300 asserts the "output valid while idle" error signal, indicating that an output valid was produced by core 200 while core 200 reported an idle state. As previously described in conjunction with FIG. 1, the error signal may be stored in device status unit 135 and used to generate a system interrupt.

Figure 5B:
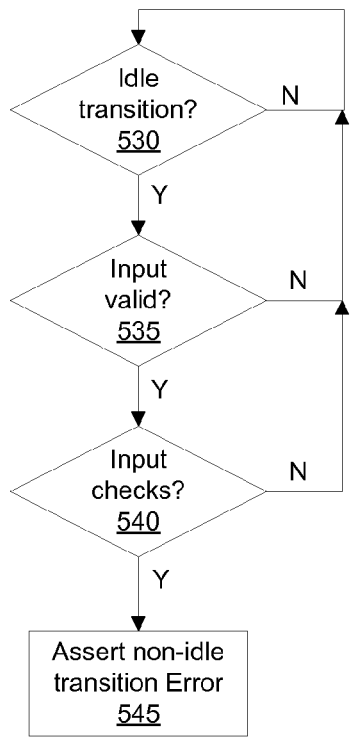
FIG. 5B is a flow diagram of an exemplary embodiment of determining an "non-idle transition" error condition in accordance with one or more aspects of the present invention.

FIG. 5B is a flow diagram of an exemplary embodiment of determining a "non-idle transition" error, in accordance with one or more aspects of the present invention. In step 530 watchdog monitor control unit 300 determines if the idle transition signal from idle transition detector 310 is asserted, indicating that core 300 has transitioned from an idle state to a non-idle state. If, in step 500 watchdog monitor control unit 300 determines that the idle transition signal is not asserted, then watchdog monitor control unit 300 repeats step 530. Otherwise, in step 535 watchdog monitor control unit 300 determines if the combined input valid signal from input valid combiner 340 is asserted, indicating that at least one of the input valid signals is asserted or that an input valid signal was asserted when the gated clock was disabled.

If, in step 535 watchdog monitor control unit 300 determines that the combined input valid signal is not asserted, then watchdog monitor control unit 300 returns to step 530. Otherwise, in step 540 watchdog monitor control unit 300 determines if input checking is enabled, i.e., if the "non-idle transition" error is enabled. If, in step 540 watchdog monitor control unit 300 determines that input checking is enabled, then watchdog monitor control unit 300 returns to step 530. Otherwise, in step 545 watchdog monitor control unit 300 asserts the "non-idle transition" error signal, indicating that an input valid was not received by core 200 to cause an idle to non-idle state transition. As previously described in conjunction with FIG. 1, the error signal may be stored in device status unit 135 and used to generate a system interrupt.

Figure 6:
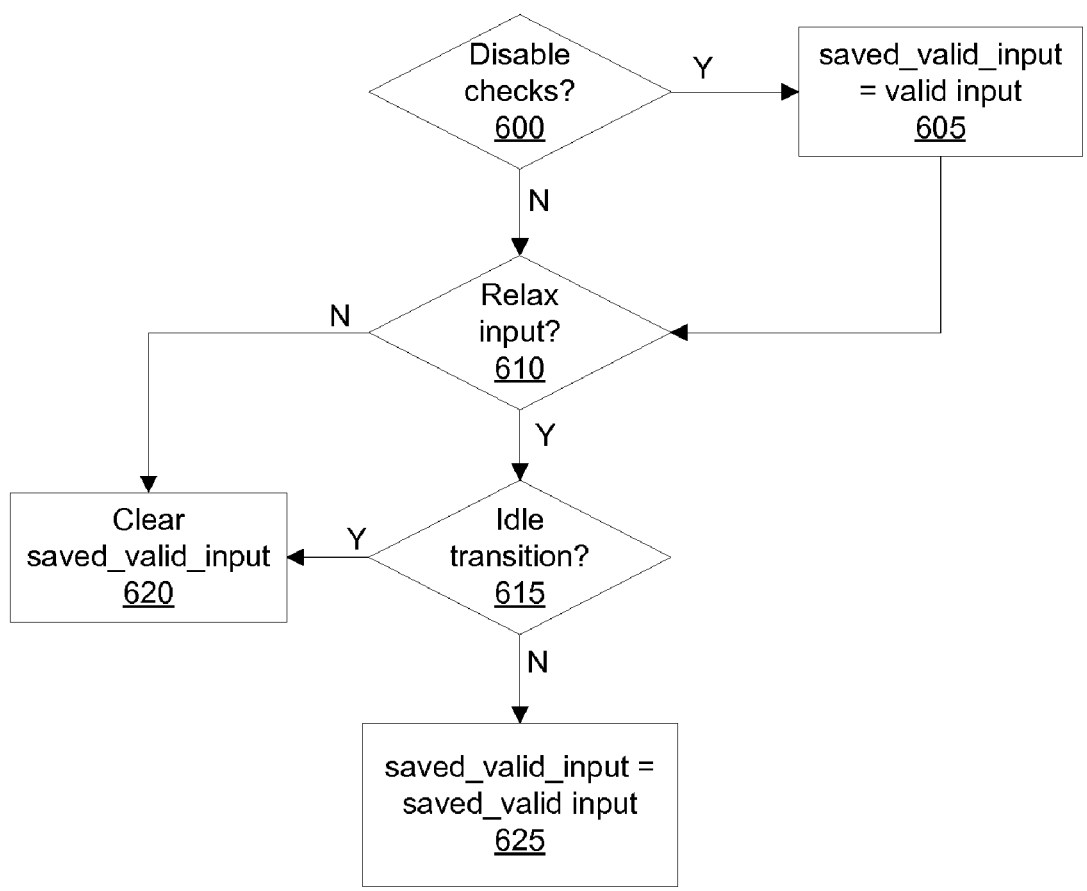
FIG. 6 is a flow diagram of an exemplary embodiment of determining an input valid signal when clock gating is used in accordance with one or more aspects of the present invention.

FIG. 6 is a flow diagram of an exemplary embodiment of determining the saved input valid signal when clock gating is used, in accordance with one or more aspects of the present invention. In step 600 input valid combiner 340 determines if the disable checks signal is asserted, indicating that the gated clock is disabled or that context switching operations are underway to reconfigure the processing unit or computing device 100. If, in step 600 input valid combiner 340 determines that the disable checks signal is asserted, then in step 605 input valid combiner 340 stores the logical OR of the input valid signals output by the input registers in a register as saved_valid_input and proceeds to step 610. If, in step 600, input valid combiner 340 determines that the disable checks signal is not asserted, then input valid combiner 340 proceeds directly to step 610.

In step 610 input valid combiner 340 determines if the relax_input setting provided by configuration unit 320 is asserted, and, if so, then in step 620 input valid combiner 340 clears saved_valid_input. Otherwise, in step 615 input valid combiner 340 determines if the idle transition signal from idle transition detector 310 is asserted, indicating that core 300 has transitioned from an idle state to a non-idle state, and, if so, in step 620 input valid combiner clears saved_valid_input. If, in step 615 input valid combiner 340 determines that the idle transition signal from idle transition detector 310 is not asserted, indicating that core 300 remains in an idle state, then in step 625 input valid combiner 340 continues to store the previously loaded saved_valid_input value. If an input_valid was received while disable checks is asserted, input valid combiner 340 will capture the input_valid as saved_valid_input and hold the value until disable checks is negated and either relax_input is asserted or core 200 transitions from idle to non-idle.

Persons skilled in the art will appreciate that any system configured to perform the method steps of FIG. 5A, 5B, or 6, or their equivalents, is within the scope of the present invention.

Accurate status reporting of an idle state is needed to safely disable a clock signal for a processing unit or to reconfigure the processing unit during a context switching operation. When the processing unit reports an idle state in error, any data being processed may be corrupted when the clock input to the unit is disabled or when the processing unit is reconfigured. A watchdog monitor may be used during functional simulation to identify status reporting errors for a processing unit. In particular, the watchdog monitor may identify when a processing unit transitions from an idle state to non-idle state without receiving a valid input. The watchdog monitor may also identify when a valid output occurs when the unit is reporting an idle state. The watchdog monitor may be synthesized to produce circuitry for formal verification, emulation, and functional device testing and debugging. The watchdog monitor may also be configured based on specific characteristics of the processing unit that it is monitoring.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method for monitoring status reporting within a computing device to identify error conditions, comprising:
   receiving a status reporting signal indicating whether a processing unit within the computing device is in an idle state or non-idle state, wherein the idle state indicates the processing unit is not processing data and the non-idle state indicates that the processing unit is processing data;
   receiving a input valid signal or a valid output signal corresponding to an interface of the processing unit;
   determining whether an error condition occurs indicating that the processing unit incorrectly reported the idle or non-idle state based on the status reporting signal and the input valid signal or the valid output signal; and
   indicating the error condition occurred by setting an error flag corresponding to the error condition.

2. The method of claim 1, wherein multiple valid outputs corresponding to multiple output interfaces of the processing unit are logically ORed for a combined valid output that is used to produce an "output valid while idle" error condition flag.

3. The method of claim 2, wherein the "output valid while idle" error condition flag is set when the status reporting signal indicates that the processing unit is idle and the combined valid output signal is asserted, indicating that valid data is produced by the processing unit.

4. The method of claim 1, further comprising signaling that an idle transition event has occurred by asserting an idle transition signal when the status reporting signal changes from the idle state to the non-idle state.

5. The method of claim 4, wherein multiple valid inputs corresponding to multiple input interfaces of the processing unit are logically ORed for a combined valid input that is used to produce a "non-idle transition" error condition flag.

6. The method of claim 5, wherein the "non-idle transition" error condition flag is set when the idle transition event signal is asserted and the combined input valid signal is not asserted.

7. The method of claim 5, further comprising delaying the combined input valid signal by a specified number of clock cycles before determining whether the error condition occurs.

8. The method of claim 1, further comprising:
   disabling a gated clock signal input to the processing unit;
   storing the input valid signal as a saved input valid signal until the gated clock signal input to the processing unit is enabled; and
   combining the saved input valid signal with the combined input valid signal by logically ORing the saved input valid signal with the combined input valid signal.

9. The method of claim 8, further comprising disabling the indicating that the error condition occurred while the gated clock signal is disabled.

10. The method of claim 9, further comprising clearing the saved input valid signal when a relax inputs configuration is specified.

11. The method of claim 1, further comprising enabling error condition checking by setting a mode to enable and disable the indicating that the error condition occurred.

12. The method of claim 1, further comprising:
   asserting a disable check signal during a context switching operation; and
   disabling the indicating that the error condition occurred while the disable check signal is asserted.

13. The method of claim 1, further comprising producing a system interrupt when the error condition flag is set.

14. A system for monitoring unit status reporting within a computing device to identify error conditions, comprising:
   an input valid combiner configured to receive input valid signals each corresponding to an input interface of a processing unit within the computing device and produce a combined input valid signal;
   an idle transition detector configured to receive a status reporting signal indicating whether the processing unit is in an idle state or non-idle state and produce an idle transition signal, wherein the idle state indicates the processing unit is not processing data and the non-idle state indicates that the processing unit is processing data; and a watchdog monitor control unit coupled to the input valid combiner and the idle transition detector and configured to produce an error flag based on the idle transition signal and the combined input valid signal.

15. The system of claim 14, further comprising an output valid combiner coupled to the watchdog monitor control unit and configured to receive valid output signals each corresponding to an output interface of the processing unit and produce a combined output valid signal by logically ORing the valid output signals, and wherein the watchdog monitor control unit is further configured to produce an "output valid while idle" error flag when the processing unit is in the idle state and the combined valid output signal is asserted.

16. The system of claim 14, further comprising a configuration unit coupled to the input valid combiner and the watchdog monitor control unit and configured to store configuration information that is used to determine whether an error condition occurs.

17. The system of claim 16, wherein the combined input valid signal is produced by logically ORing the input valid signals and delaying the combined input valid signal by a number of clock cycles specified by the configuration information.

18. The system of claim 14, further comprising a device status unit coupled to the watchdog monitor control unit and configured to store the error flag in a register that is set by the watchdog monitor control unit and cleared by another computing device when a system interrupt is processed.

19. The system of claim 14, wherein the input valid combiner is further configured to receive a disable checks signal that is used to store a logical OR of the input valid signals as a saved input valid signal when the disable checks signal is asserted in order to retain any asserted input valid signals while a gated clock input to the processing unit is disabled.

20. The system of claim 14, wherein the computing device is configured to operate within an emulation environment.

* * * * *